Feb. 21, 1967  L. J. HOFFMAN  3,305,712
PLURAL MOTOR ACCELERATION AND BRAKING SYSTEM
Filed April 3, 1963
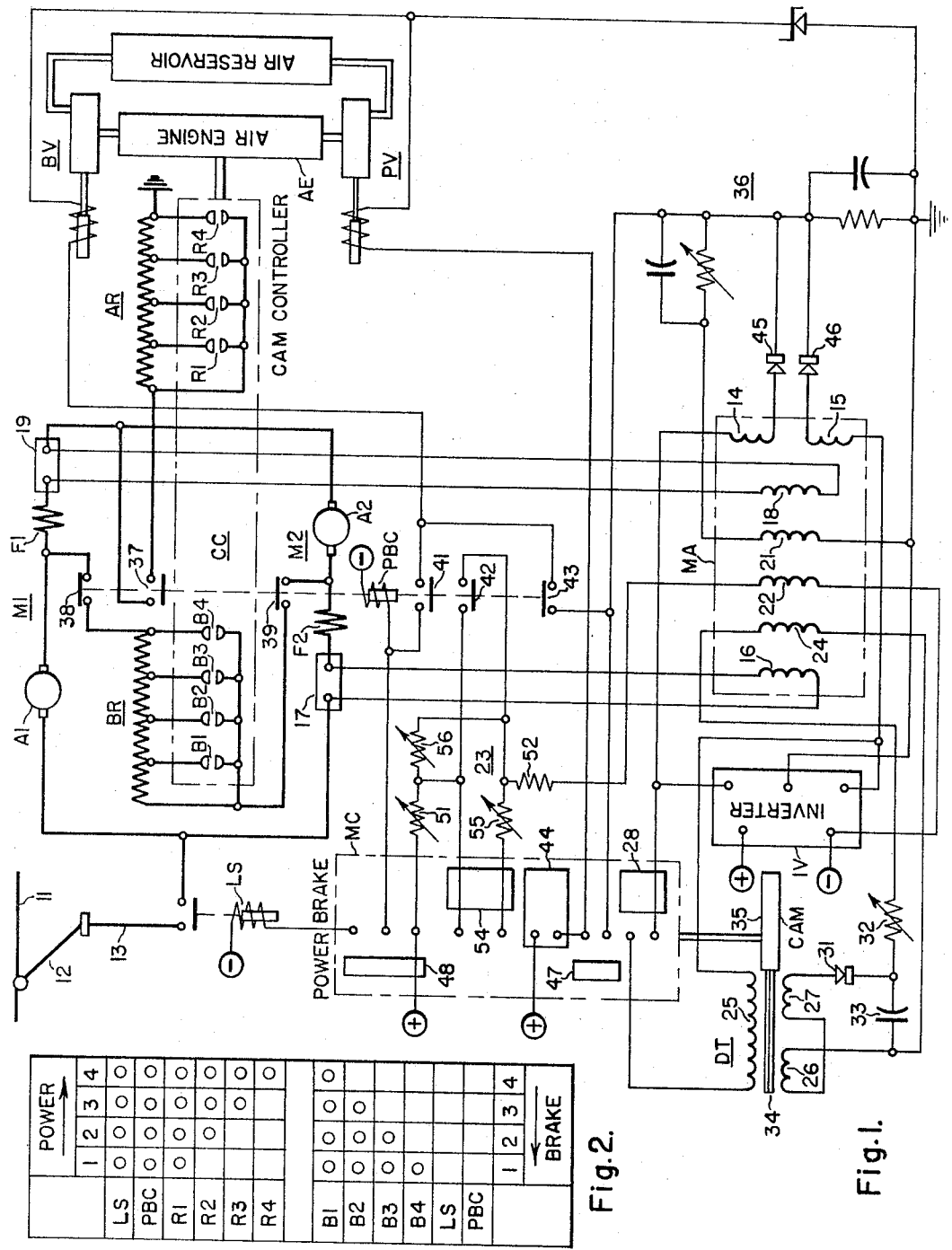
WITNESSES
Theodore F. Wrobel
James F. Young
INVENTOR
Lester J. Hoffman
BY
ATTORNEY

United States Patent Office 3,305,712
Patented Feb. 21, 1967

3,305,712
PLURAL MOTOR ACCELERATION AND
BRAKING SYSTEM
Lester J. Hoffman, Penn Hills Township, Allegheny County, Pa., assignor to Westinghouse Electric Corporation, Pittsburgh, Pa., a corporation of Pennsylvania
Filed Apr. 3, 1963, Ser. No. 270,334
5 Claims. (Cl. 318—63)

This invention relate generally to motor control systems and, more particularly, to systems for controlling the operation of traction motors which are utilized for propelling rapid transit vehicles such as subway cars.

Heretofore, the acceleration and dynamic braking of direct current traction motors which propel a vehicle have been controlled by shunting resistors in the motor circuitry in steps by means of a controller driven by an air engine controlled by magnet valves. The energization of the magnet valves has been controlled by an electro-mechanical current limit relay responsive to the motor current. Frequent maintenance and adjustment of the relay have been necessary, since it has moving parts which are subject to wear, and it must be kept in proper adjustment in order to function properly.

An object of this invention is to provide a motor control system utilizing a static device for controlling the operation of a controller for shunting resistors in the circuit of the motors which propel a vehicle.

Another object of the invention is to utilize a bistable magnetic amplifier for controlling the energization of magnet valves which control the operation of an air engine that drives a controller for shunting resistance from the circuit of the motors.

A further object of the invention is to obtain desired rates of acceleration and braking of the vehicle propelled by the traction motors by biasing the magnetic amplifier.

Still another object of the invention is to provide for varying the braking rates during operation of the vehicle.

Other objects of the invention will be explained fully hereinafter or will be apparent to those skilled in the art.

In accordance with one embodiment of the invention, a bistable magnetic amplifier is supplied with alternating current through an inverter. The output of the amplifier energizes the magnet valves of an air engine which drives a cam controller for shunting resistance from the motor circuit during acceleration and dynamic braking of an electrically propelled vehicle. The amplifier functions as a switch and is turned "on" and "off" by control windings energized by a current proportional to the motor current. A biasing winding on the amplifier is utilized to obtain desired rates of acceleration and braking. A differential transformer also changes the bias of the magnetic amplifier to vary the braking rate in accordance with the position of the braking controller. A Zener diode is utilized in the circuit for the magnet valves to prevent the valves from remaining closed due to back bias on the magnetic amplifier.

For a better understanding of the invention, reference may be had to the following detailed description, taken in conjunction with the accompanying drawing, in which the FIGURE 1 is a diagrammatic view of a control system embodying the principal features of the invention.

FIG. 2 is a table which shows the energization of the various control circuits as the master controller MC is moved through its power and brake modes.

Referring to FIGURE 1 of the drawing, the system shown therein comprises two traction motors M1 and M2, a line switch LS, a braking resistor BR, an accelerating resistor AR, a cam controller CC, an air engine AE having a braking magnet valve BV and a power magnet valve PV, a master controller MC, a power-brake control switch PBC, a magnetic amplifier MA, an inverter IV, a differential transformer DT, a Zener diode Z and a number of resistors, capacitors, and rectifiers which will be mentioned hereinafter.

The motors M1 and M2 are preferably of the direct current series type suitable for propelling a vehicle, such as subway car (not shown). The motor M1 has an armature winding A1 and a series field winding F1. Likewise, the motor M2 has an armature winding A2 and a series field winding F2. As shown, the motors are connected in parallel-circuit relation. It will be understood that the motors could be first connected in series-circuit relation and then in parallel-circuit relation, if desired, in a manner well known in the art. It will also be understood that additional motors, similar to the motors M1 and M2, could be provided if desired. The line switch LS is provided for connecting the motors to a trolley conductor 11 through a current collector 12 and a power conductor 13.

The power-brake control switch PBC is provided for connecting the motors to the accelerating resistor during acceleration of the motors. When the switch PBC is in the deenergized position it establishes dynamic braking connections for the motors and connects the braking resistor BR in the dynamic braking circuit. During dynamic braking the field winding F2 is connected in series-circuit relation with the armature winding A1, and the field winding F1 is connected in series-circuit relation with the armature winding A2. The braking resistor BR is connected in a circuit which is common to both of the motor braking circuits.

The cam controller CC is provided for shunting the accelerating resistor AR from the motor circuit step-by-step during acceleration of the motors and for shunting the braking resistor BR from the motor circuit during dynamic braking of the motors. It will be understood that the controller CC may be of the drum type instead of the cam type, or that a plurality of switches or contactors may be utilized for shunting the resistors step-by-step with the operation of the contactors controlled by a controller of the drum type.

The air engine AE may be of a type well known in the art. The air engine drives the cam controller CC in one direction during acceleration and in the opposite direction during dynamic braking of the motors. The magnet valves PV and BV which control the operation of the air engine are both of the standard type. A standard magnet valve is one which admits air to the operating cylinder of the air engine when the coil of the magnet valve is energized. It exhausts air from the cylinder when the coil of the valve is deenergized.

The master controller MC may also be of a type well known in the art. When the controller is actuated in one direction circuits are established to apply power to the motors to accelerate the vehicle. When the controller is actuated in the other direction dynamic braking circuits for the motors are established to decelerate the vehicle.

The motor control system, as so far described, has been shown in a very much simplified form for the purpose of illustration and is to be taken as representing any traction motor control system of this general type, such as that shown in more detail in a patent to R. R. Lewis, No. 2,802,162, for example. It will be understood that the invention is generally applicable to any such control system in which a resistance-shunting controller of any type has heretofore been controlled by an electro-mechanical limit relay.

The magnetic amplifier MA is preferably of the bistable type. A bistable magnetic amplifier functions in a manner similar to a switch, that is, under certain conditions, a relatively large amount of current is permitted to flow through load windings 14 and 15 of the amplifier, while, under other conditions, practically no current flows through the load windings. The amplifier is provided with a control winding 16 which is connected across a shunt 17 in the motor circuit and another control winding 18 which is connected across another shunt 19 in the motor circuit. Thus, the control windings are energized by current which is proportional to, or responsive to, the motor current. The amplifier is provided with a feedback winding 21 which functions in the usual manner to provide an additional magnetomotive force that is a function of the output of the amplifier.

The amplifier is also provided with a bias winding 22 which is connected across a direct current power source through a resistor network 23. The resistor network is so arranged that one value of resistance is connected in circuit relation with the bias winding 22 during acceleration of the motor and a different value of resistance is connected in circuit relation with the winding 22 during dynamic braking of the motors, thereby obtaining the desired rates of acceleration and braking.

The magnetic amplifier is also provided with a bias winding 24 which is energized by the differential transformer DT. The transformer has a primary winding 25 and two differentially connected secondary windings 26 and 27. The primary winding 25 is connected across the output terminals of the inverter IV through a contact segment 28 on the controller MC during dynamic braking of the motor. The secondary windings 26 and 27 are connected to the bias winding 24 through a rectifier 31 and a resistor 32. A capacitor 33 is connected across the output leads of the secondary windings. A movable core 34 is actuated by a cam 35 driven by the master controller MC.

When the core 34 is centered with respect to the differential windings 26 and 27 the potentials of the two windings are equal and there is no output from the transformer since the two windings are connected in opposed circuit relation. When the core 34 is moved off-center by the cam 35 the potentials of the two windings are unequal and there is an output from the transformer. Thus, the current in the bias winding 24 may be varied in accordance with the position of the master controller MC during dynamic braking to obtain variable rates of dynamic braking. If desired, a similar arrangement could be utilized to obtain variable rates of acceleration during operation of the vehicle.

The inverter IV is preferably a static inverter and may be of any suitable type. As shown, the inverter has input terminals which are connected to a source of direct current power, one output terminal which is connected to the load winding 14 of the magnetic amplifier, another output terminal which is connected to the load winding 15 of the amplifier and a center terminal to which the return circuit for the amplifier is connected.

The feedback winding 21 of the amplifier is connected to its output circuit through a resistor-capacitor network 36. As previously explained, the feedback winding provides an additional magnetomotive force that is a function of the output and is used to influence the amplifier characteristics in a manner well known in the art.

In order that the functioning of the apparatus may be more clearly understood, the operation of the system will now be described in more detail. Assuming that it is desired to accelerate the motor, the master controller MC is actuated to the "power" position. When the controller MC is in the "power" position the actuating coil of the line switch LS is energized to close this switch, thereby connecting the motors to a suitable power source (not shown).

The actuating coil of the switch PBC is also energized at this time, thereby closing the main contact members 37 of this switch and opening main contact members 38 and 39. Auxiliary contact members 41 and 42 are closed and auxiliary contact member 43 is opened at this time. While the controller MC was in the "off" position, the power magnet valve PV was energized through a contact segment 44 of the controller MC to hold the cam controller CC in the "off" position.

When the controller MC is moved to the power position the energizing circuit for the power magnet valve PV is transferred to the output rectifiers 45 and 46 of the magnetic amplifier MA. The circuit for the coil of the magnet valve PV extends through a contact segment 47 of the controller MC.

At this time the coil of the brake magnet valve BV is energized through a circuit which extends through the contact member 41 of the switch PBC and a contact segment 48 of the master controller MC. Thus, the cam controller CC is driven by the air engine in a direction to shunt the resistor AR from the motor circuit step-by-step by closing contact members R1 to R4 in sequential relation.

The advancement of the cam controller is under the control of the magnetic amplifier MA which, in turn, controls the energization and the deenergization of the magnet valve PV. When the motor current reaches a predetermined value the control windings 16 and 18 of the magnetic amplifier which are energized by current proportional to the motor current, turn "on" the amplifier, thereby energizing the coil of the magnet valve PV to stop the progression of the cam controller. When the counter electromotive force of the motor reduces the motor current sufficiently to turn "off" the magnetic amplifier the magnet valve PV is deenergized, thereby permitting the air engine to advance the cam controller to shunt another step of resistance from the motor circuit. In this manner the cam controller is advanced under the control of the magnetic amplifier until all of the accelerating resistor AR is cut out of the motor circuit. The cam controller is held in this position by the magnet valve BV.

During acceleration of the motors, the bias winding 22 of the amplifier MA is energized through a circuit which includes a variable resistor 51, contact members 42 of the switch PBC and a fixed resistor 52. Thus, the winding 22 is energized to provide a desired accelerating rate by determining the characteristics of the amplifier MA.

When it is desired to decelerate the vehicle by means of dynamic braking, the master controller MC is actuated to the "brake" position. When the controller MC is in the "brake" position to the line switch LS and the switch PBC are deenergized. Thus, the contact members of the line switch are opened to disconnect the motors from the power source, and the main contact members 38 and 39 of the switch PBC are closed to establish the dynamic braking circuits for the motors. Auxiliary contact member 43 is also closed at this time. The magnet valve PV of the air engine is energized through the segment 44 of the controller MC. The energizing circuit for the brake valve BV is transferred to the output rectifiers 45 and 46 of the amplifier MA through the contact member 43 of the switch PBC.

The cam controller CC is driven in a direction opposite to that during acceleration, thereby shunting the braking resistor BR from the motor circuit step-by-step by closing contacts B1 to B4 in sequential relation. When the braking current exceeds a predetermined value, the magnet valve BV is energized by the turning "on" of the amplifier MA, by the control windings 16 and 18, to stop the progression of the controller CC. When the braking current drops to the turn "off" point of the amplifier, the valve BV is deenergized to permit the controller CC to advance another step. This operation is continued until the resistor BR is entirely shunted from the motor circuit.

During dynamic braking, the bias winding 22 of the amplifier is energized through a circuit which includes the resistor 51, a contact segment 54 of the controller MC, a resistor 55 and the resistor 52. A resistor 56 is connected in parallel-circuit relation with the resistor 55. Thus, the resistance in the circuit for the bias winding 22 is different during dynamic braking from the resistance in the circuit during acceleration, thereby providing different rates of acceleration and braking.

Also, during dynamic braking the bias winding 24 is energized through the differential transformer DT in the manner previously described. In this manner the braking rate may be varied by changing the position of the master controller during dynamic braking.

As previously explained, the Zener diode Z, which is in the return circuit for the magnet valves PV and BV, cooperates with the magnetic amplifier in controlling the operation of the magnet valves. The Zener diode has a predetermined breakdown voltage. Thus, the output voltage of the magnetic amplifier must be above this breakdown voltage in order for sufficient current to flow through the respective magnet valve coil to operate the magnet valve. In this manner the magnet valve is prevented from remaining closed due to a back bias on the magnetic amplifier.

From the foregoing description it is apparent that the invention provides for using a magnetic amplifier for controlling the acceleration and the dynamic braking of an electric motor or motors. The operation of the resistor shunting controller is controlled by the magnetic amplifier which, in turn, is responsive to the motor current. Since the amplifier is a static device, it has no moving parts which are adversely affected by wear. The bias windings on the amplifier permit different desired rates of acceleration and braking to be obtained. They also permit the braking rate to be varied during operation of the motors. The control system is relatively simple and it may be manufactured and installed economically.

Since numerous changes may be made in the above-described construction, and different embodiments of the invention may be made without departing from the spirit and scope thereof, it is intended that all matter contained in the foregoing description or shown in the accompanying drawing shall be interpreted as illustrative and not in a limiting sense.

I claim as my invention:

1. In a control system for an electric traction motor, means for connecting the motor to a power source to accelerate the motor, means for establishing connections for dynamic braking of the motor, resistance means for controlling the motor current, control means for progressively varying said resistance means during acceleration and during braking, and magnetic amplifier means for controlling the operation of said control means, said magnetic amplifier means including means responsive to the motor current for effecting interruption of the operation of the control means when the motor current exceeds a predetermined value, and said magnetic amplifier means including biasing means for biasing the magnetic amplifier differently during acceleration and during braking of the motor, whereby said predetermined value of current may be different for acceleration and for braking.

2. In a control system for an electric traction motor, means for connecting the motor and an accelerating resistor to a power source to accelerate the motor, means for establishing a circuit for dynamic braking of the motor, said dynamic braking circuit including a braking resistor connected to carry the motor current, control means for progressively varying said accelerating resistor during acceleration of the motor and for progressively varying said braking resistor during braking of the motor, and magnetic amplifier means for controlling the operation of said control means, said magnetic amplifier means having a control winding excited in response to the motor current to cause the magnetic amplifier means to effect interruption of the operation of the control means when the motor current exceeds a predetermined value, and the magnetic amplifier means including means for changing said predetermined value of current.

3. In a control system for an electric traction motor, means for connecting the motor and an accelerating resistor to a power source to accelerate the motor, means for establishing a circuit for dynamic braking of the motor, said dynamic braking circuit including a braking resistor connected to carry the motor current, control means for progressively varying said accelerating resistor during acceleration of the motor and for progressively varying said braking resistor during braking of the motor, magnetic amplifier means for controlling the operation of said control means, said magnetic amplifier means having a control winding excited in response to the motor current and having biasing means, said control winding being operative to cause the magnetic amplifier means to effect interruption of the operation of the control means when the motor current exceeds a value determined by the energization of the biasing means, and means for energizing the biasing means differently during acceleration and during braking of the motor, whereby the rate of acceleration and the rate of braking are different.

4. In a control system for an electric traction motor, means for connecting the motor and an accelerating resistor to a power source to accelerate the motor, means for establishing a circuit for dynamic braking of the motor, said dynamic braking circuit including a braking resistor connected to carry the motor current, control means for progressively varying said accelerating resistor during acceleration of the motor and for progressively varying said braking resistor during braking of the motor, magnetic amplifier means for controlling the operation of said control means, said magnetic amplifier means having a control winding excited in response to the motor current and having biasing means, said control winding being operative to cause the magnetic amplifier means to effect interruption of the operation of the control means when the motor current exceeds a value determined by the energization of the biasing means, means for energizing the biasing means differently during acceleration and during braking of the motor, whereby the rate of acceleration and the rate of braking may be different, and means for varying the energization of the biasing means during braking to control the rate of braking.

5. In a control system for an electric traction motor, means for connecting the motor and an accelerating resistor to a power source to accelerate the motor, means for establishing a circuit for dynamic braking of the motor, said dynamic braking circuit including a braking resistor connected to carry the motor current, control means for progressively varying said accelerating resistor during acceleration of the motor and for progressively varying said braking resistor during braking of the motor, magnetic amplifier means for controlling the operation of said control means, said magnetic amplifier means having a control winding excited in response to the motor current and having first and second biasing windings, said control winding being operative to cause the magnetic amplifier means to effect interruption of the operation of the control means when the motor current exceeds a value determined by the energization of said biasing windings, means for energizing the first biasing winding during acceleration of the motor and for differently energizing the first biasing winding during braking of the motor, whereby the rate of acceleration and the rate of braking may be different, and means for variably energizing the second biasing winding during braking to control the rate of braking.

(References on following page)

References Cited by the Examiner

UNITED STATES PATENTS

| | | | |
|---|---|---|---|
| 1,871,697 | 8/1932 | James | 318—403 X |
| 1,894,971 | 1/1933 | Austin et al. | 318—63 |
| 2,030,119 | 2/1936 | Powers et al. | 318—395 X |
| 2,081,977 | 6/1937 | Bendz | 318—403 X |
| 2,597,183 | 5/1952 | Riley | 318—274 X |
| 2,626,362 | 1/1953 | Johansson | 318—144 X |
| 2,884,578 | 4/1959 | Bradburn et al. | 318—144 X |
| 3,089,991 | 5/1963 | Stamm | 318—144 |

FOREIGN PATENTS

| | | |
|---|---|---|
| 737,399 | 9/1955 | Great Britain. |
| 864,755 | 4/1961 | Great Britain. |

ORIS L. RADER, *Primary Examiner.*

T. LYNCH, *Assistant Examiner.*